United States Patent [19]

Takahashi et al.

[11] Patent Number: 5,493,418
[45] Date of Patent: Feb. 20, 1996

[54] PROCESSING AND PRINTING VIDEO IMAGES AND SCANNED ORIGINAL IMAGE WITH CONTROLLED ASPECT RATIOS OF VIDEO SIGNALS

[75] Inventors: Koji Takahashi; Masahiko Enari; Yushi Kaneko, all of Yokohama, Japan

[73] Assignee: Canon Kabushiki Kaisha, Tokyo, Japan

[21] Appl. No.: 380,203

[22] Filed: Jan. 30, 1995

Related U.S. Application Data

[63] Continuation of Ser. No. 716,942, Jun. 18, 1991, abandoned.

[30] Foreign Application Priority Data

Jun. 19, 1990 [JP] Japan .................. 2-160368

[51] Int. Cl.⁶ .................................... H04N 1/393
[52] U.S. Cl. .................. 358/451; 358/448; 358/296; 358/447; 348/445; 348/581
[58] Field of Search .................... 358/451, 447, 358/445, 448, 400, 442, 296, 298, 452, 501, 523, 524, 525, 528; 348/581, 445, 459, 448; 395/102

[56] References Cited

U.S. PATENT DOCUMENTS

| | | | |
|---|---|---|---|
| 4,258,385 | 3/1981 | Greenberg et al. | 358/80 |
| 4,658,300 | 4/1987 | Kawamura et al. | 358/409 |
| 4,701,808 | 10/1987 | Nagashima | 358/451 |
| 4,730,215 | 3/1988 | Jose et al. | 358/141 |
| 4,931,855 | 6/1990 | Salvadorini | 358/141 |
| 5,068,728 | 11/1991 | Macovski | 358/142 |
| 5,093,730 | 3/1992 | Ishii et al. | 358/445 |
| 5,097,332 | 3/1992 | Faroudja | 358/142 |
| 5,146,548 | 9/1992 | Bijnagte | 358/455 |
| 5,193,000 | 3/1993 | Lipton et al. | 358/146 |
| 5,193,006 | 3/1993 | Yamazaki | 358/142 |
| 5,327,235 | 7/1994 | Richards | 348/441 |

FOREIGN PATENT DOCUMENTS

| | | | |
|---|---|---|---|
| 421773 | 4/1991 | European Pat. Off. . | |
| 150892 | 6/1990 | Japan | G09G 5/00 |

Primary Examiner—Scott A. Rogers
Assistant Examiner—Fan Lee
Attorney, Agent, or Firm—Fitzpatrick, Cella, Harper & Scinto

[57] ABSTRACT

An image processing apparatus can deal with a plurality of kinds of video signals. The apparatus includes a circuit for generating a signal indicating the kind of an input video signal, and magnification varying circuit for varying the aspect ratio of an image of the input video signal in accordance with a result of discrimination by the signal generation circuit. The aspect ratio of a pixel (picture element) is automatically corrected in accordance with the input video signal by the above-described circuits. Accordingly, it becomes unnecessary to manually set the aspect ratio of a pixel in accordance with the kind of the input video signal. Hence, operation is greatly simplified.

19 Claims, 9 Drawing Sheets

PROCESSING AND PRINTING VIDEO IMAGES AND SCANNED ORIGINAL IMAGE WITH CONTROLLED ASPECT RATIOS OF VIDEO SIGNALS

This application is a continuation of U.S. application Ser. No. 07/716,942, filed Jun. 18, 1991, now abandoned.

BACKGROUND OF THE INVENTION

1. Field of the Invention

This invention relates to an image processing apparatus and method, and more particularly, to an apparatus which can process images of a plurality of kinds of image signals.

2. Description of the Related Art

Recently, many kinds of copiers have become able to deal with not only black-and-white prints but also color prints, and copiers which can print not only color originals but also images of image signals have also been commercialized.

In accordance with the recent progress of semiconductor technology, digital processing of image information, such as video signals or the like, has spread widely, and there has arisen a desire to be able to supply video signals to a color printing apparatus from a video signal source in the form of digital signals.

An explanation will now be provided of a case wherein, for example, NTSC composite signals are used as video signals. When digitizing NTSC composite signals, the sampling frequency is usually set to 4 times the frequency of the color sub-carrier, that is, 4 fsc. This is because digital color demodulation processing in the following stage becomes simplified if this sampling frequency is adopted. If the sampling frequency is thus set to 4 fsc, the number of samples in the horizontal direction (lateral direction) becomes 910, as shown in FIG. 5. Considering an aspect ratio of 3:4 with 525 lines in the vertical direction, in the case of 700 (=525×4/3) samples, the pixel (picture element) becomes square as shown by broken lines in FIG. 6. In the case of 910 samples, however, the shape of the pixel (the hatched portion in FIG. 6) becomes about 30% longer in the vertical direction than in the horizontal. When the same processing as for output signals from a scanner for reading an original is performed using such a vertically-long pixel, printing having a correct aspect ratio cannot be obtained in some cases. That is, there is the problem that when, for example, a printer performs image formation assuming that the digital image data it receives have been sampled with an aspect ratio of 1:1, a correct aspect ratio is not provided in the resulting printing.

In order to solve such problem, the aspect ratio may be changed in accordance with the printer. This approach, however, necessitates a complicated operation. In addition, if it is desired to deal with a plurality of kinds of video signals, complicated setting of operation conditions is further needed.

In order to solve the above-described problems, the assignee of the present application has proposed a technique in U.S. application Ser. No. 592,991 filed Oct. 4, 1990. This technique, however, still has room for improvement from the viewpoint of operability.

SUMMARY OF THE INVENTION

It is an object of the present invention to provide an image processing apparatus and method which solve the above-described problems.

It is another object of the present invention to provide an image processing apparatus and method which can deal with a plurality of kinds of inputs.

It is still another object of the present invention to provide an image processing apparatus and method which can automatically deal with a plurality of kinds of inputs.

These objects are accomplished, according to one aspect of the present invention, by an image processing apparatus capable of dealing with a plurality of kinds of video signals, comprising discrimination means for discriminating the kind of an input video signal, and magnification varying means for varying the aspect ratio of an image of the input video signal in accordance with a result of discrimination by the discrimination means. The aspect ratio of a pixel is automatically corrected in accordance with the input video signal by the above-described means. Accordingly, it becomes unnecessary to manually set the aspect ratio of a pixel in accordance with the kind of the input video signal, greatly simplifying operation.

It is still another object of the present invention to provide an image processing apparatus and method for performing excellent image formation of both image signals for high-definition images and image signals conforming to conventional broadcast standards.

These and other objects and features of the present invention will become more apparent from the following description of the preferred embodiment taken in connection with the accompanying drawings.

DETAILED DESCRIPTION OF THE PREFERRED EMBODIMENT

The preferred embodiment of the present invention will now be explained with reference to the drawings.

Figure 1:
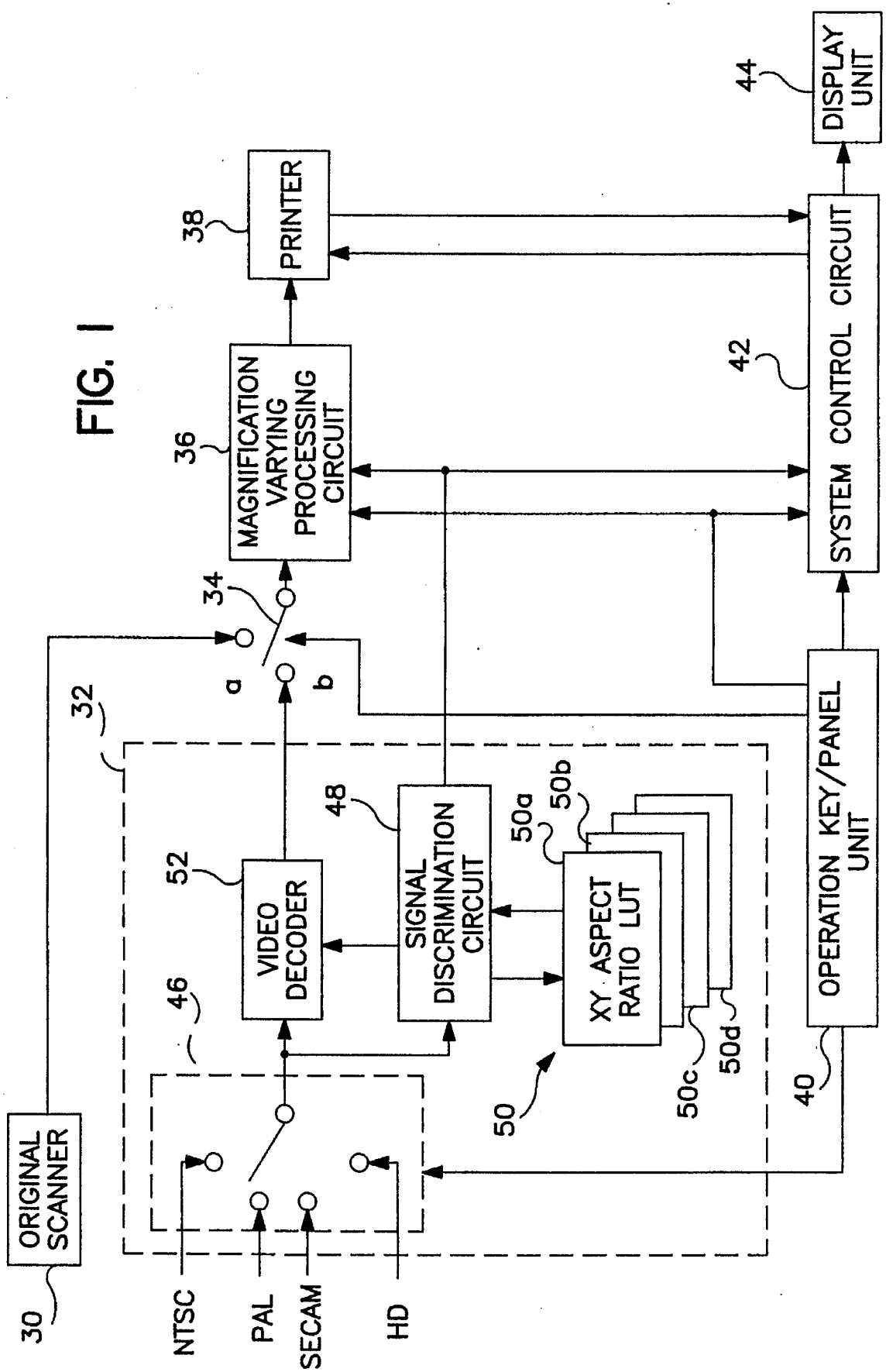
FIG. 1 is a block diagram of the configuration of the preferred embodiment of the present invention.

FIG. 1 is a block diagram of the configuration of an apparatus according to the preferred embodiment of the present invention. In FIG. 1, there are shown an original scanner 30, an interface 32 for a plurality of kinds of video signal inputs, a selection switch 34 between the output of the original scanner 30 and the output of the interface 32, an XY magnification varying processing circuit 36, a printer 38, an operation key/panel unit 40, a system control circuit 42 comprising a microcomputer, and display unit 44.

In the interface 32, there is shown a selection switch 46 for a plurality of kinds of input video signals. A signal discrimination circuit 48 discriminates the kind of input video signal, for example, according to the frequency of the synchronizing signal or the sampling frequency of the video signal. A detailed explanation of the signal discrimination circuit 48 will be provided later. Look-up tables (LUTs) 50 (50a, 50b, 50c and 50d) hold information relating to the aspect ratios of respective types of video signal. A video decoder 52 converts an output video signal from the selection switch 46 into a signal having the same configuration as an output signal from the scanner 30 in accordance with the result of discrimination obtained by the signal discrimination circuit 48.

Figure 2:
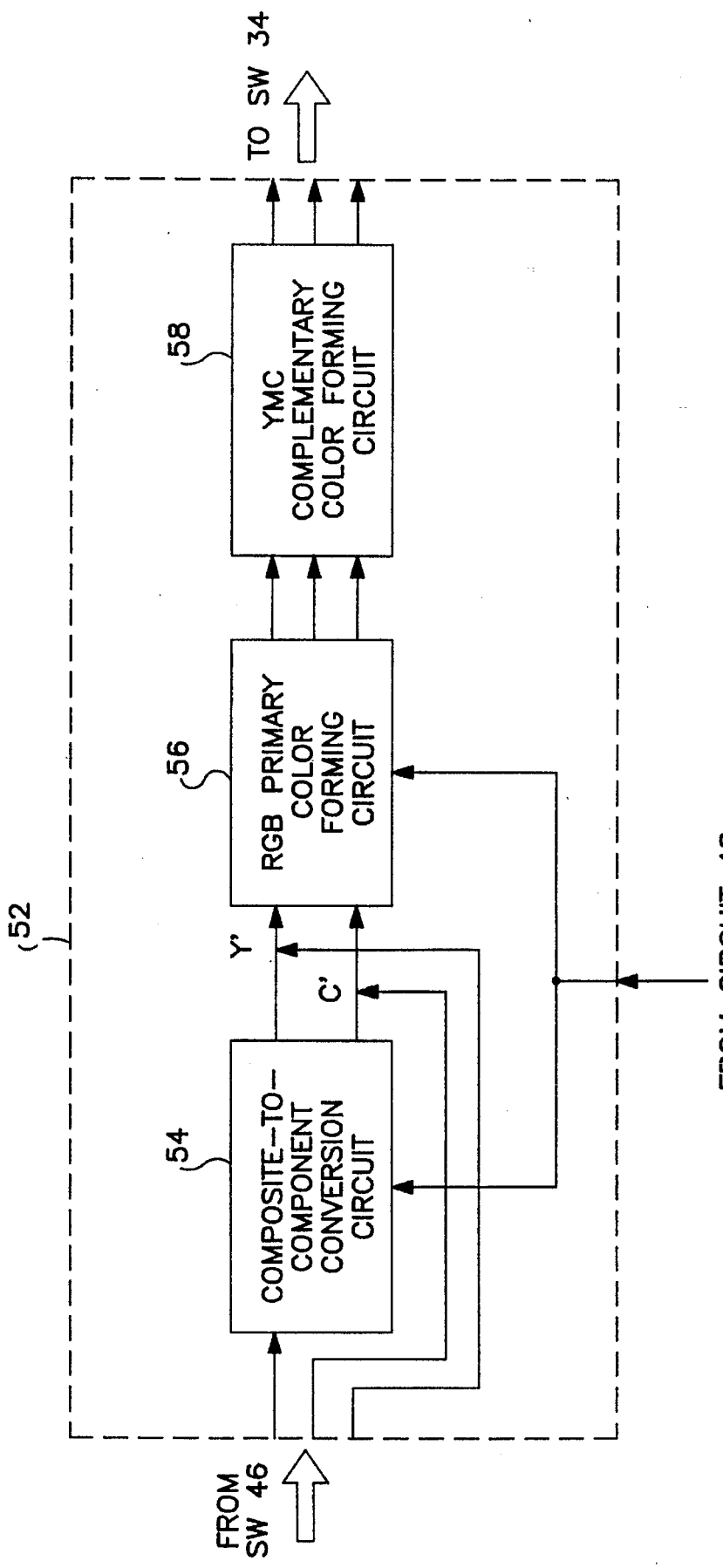
FIG. 2 is a block diagram of the configuration of a video decoder 52 shown in FIG. 1.

FIG. 2 shows the configuration of the video decoder 52. In FIG. 2, a circuit 54 converts a composite signal into components, luminance (Y') and color (C'). An RGB (red, green and blue) primary color forming circuit 56 converts the luminance and color signals Y' and C' into RGB signals. A YMC (yellow, magenta and cyan) complementary color forming circuit 58 performs YMC complementary color forming processing suitable for the printer 38 for the RGB signals. The circuits 54 and 56 are controlled according to the result of discrimination provided by the signal discrimination circuit 48.

An input video source, and the size and number of prints to be made are set using the operation key/panel unit 40. The switches 34 and 46 are switched in accordance with this setting operation. It is assumed that the switch 34 selects the output of the interface 32. The signal discrimination circuit 48 discriminates the kind of the input video signal from the synchronizing signal or the sampling frequency of the video signal selected by the switch 46. Without using the sampling frequency, the clock frequency of video data may be detected by a PLL circuit, or an identification signal may be received from the video signal source via another signal line.

The signal discrimination circuit 48 refers the result of discrimination to the LUT 50, reads information of the corresponding aspect ratio from the LUT 50, and supplies the magnification varying processing circuit 36 and the system control circuit 42 with the read information. The video decoder 52 performs video signal processing in accordance with the result of the discrimination by the signal discrimination circuit 48, and outputs a color image signal suitable for the printer 38. The output of the video decoder 52 is supplied to the magnification varying processing circuit 36 via the switch 34. In accordance with the aspect-ratio information from the signal discrimination circuit 48, the magnification varying processing circuit 38 performs aspect ratio varying processing for the output of the video decoder 52 so that the aspect ratio of a pixel becomes 1:1. The magnification varying processing circuit 36 also performs magnification/reduction processing in accordance with the varying magnification ratio set by the operation key/panel unit 40.

The output of the magnification varying processing circuit 36 is supplied to the printer 38, which outputs a color print having no distortion in the horizontal and vertical directions (as compared with printing the output of the scanner 30). The printer 38 may be either an electrophotographic printer or an ink-jet-type printer. The essential point is that the printer has a printing function.

The above-described magnification varying processing will now be explained in detail.

Figure 7:
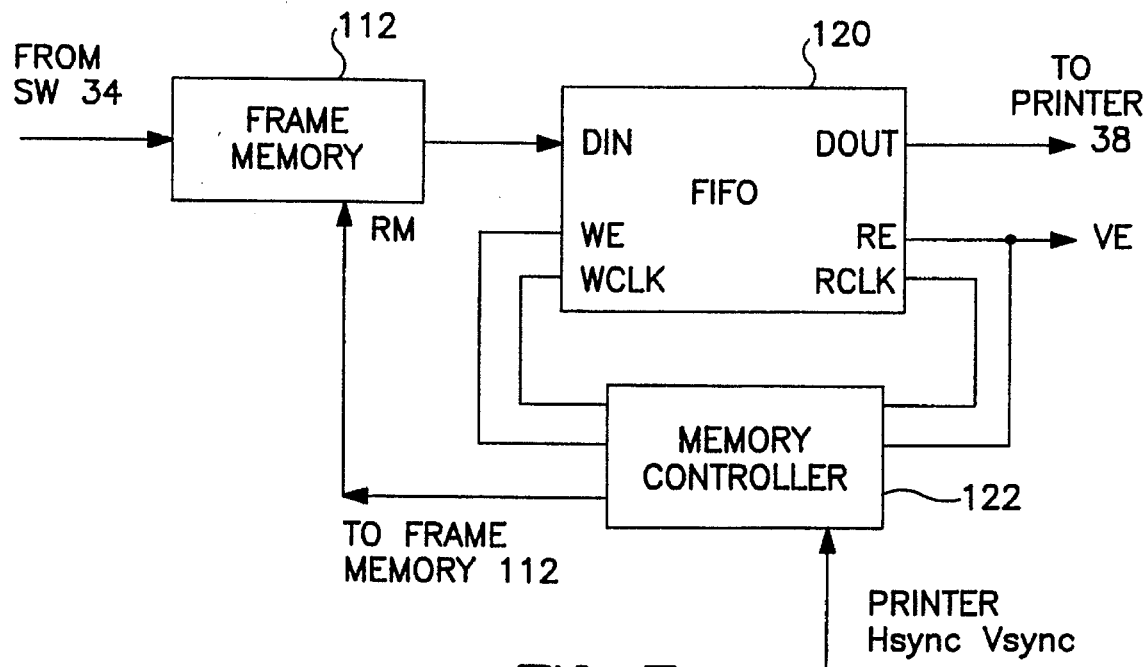
FIG. 7 shows an example of the magnification varying processing circuit shown in FIG. 1.

An explanation will be provided of a case of skipping pixels as the magnification varying processing in the present embodiment; specifically, an explanation will now be provided of a configuration for varying magnification when adopting a simple skipping method, with reference to FIG. 7.

In FIG. 7, a FIFO (first-in-first-out) memory 120 is provided for writing read data in a frame memory 112 and subsequently reading the data to the printer 38. This memory 120 is an asynchronous FIFO memory for converting (changing) the amount of data in units of a line, and may, for example, comprise a FIFO memory having a configuration of 2048×8 bits since the number of effective pixels of a high-definition image signal is 1920×1035 pixels. A memory controller 122 receives a horizontal synchronizing signal Hsync and a vertical synchronizing signal Vsync from the printer 38, and generates a read command signal RM for the frame memory 112, a write enable signal WE and a read enable signal RE for the memory 120, and a video enable signal VE indicating the effective image period for the printer 38 in synchronization with the signal Hsync.

Figure 8:
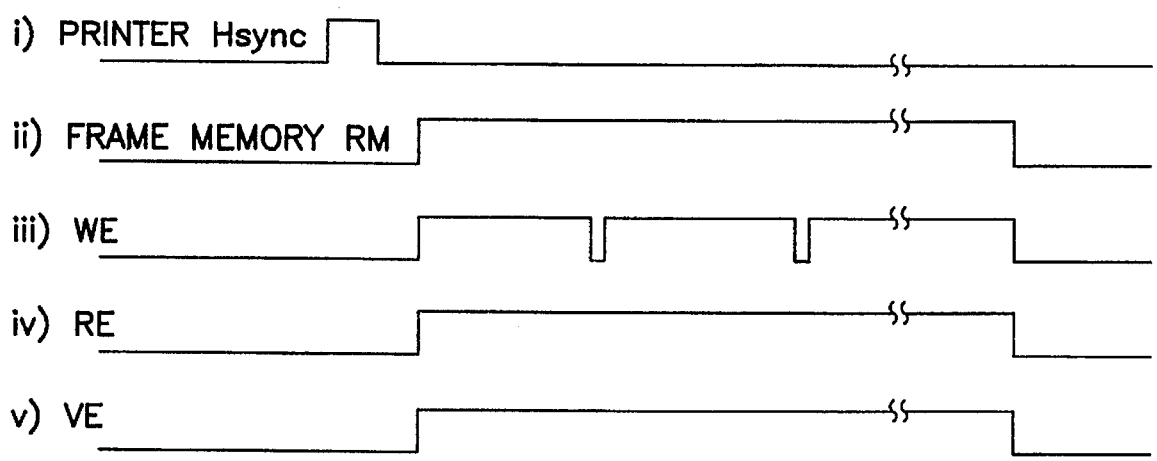
FIG. 8 illustrates the operation of the FIG. 7 circuit.

The operation of the circuit shown in FIG. 7 will now be explained with reference to the timing chart shown in FIGS. 8 i)–8 v). FIG. 8 i) shows a signal Hsync from the printer 38, FIG. 8 ii) shows a read command signal for the frame memory 112, FIGS. 8 iii) and 8 iv) show write and read enable signals for the FIFO memory 120, respectively, and FIG. 8 v) shows a video enable signal VE to be output to the printer 38. The memory controller 122 shown in FIG. 7 outputs to the FIFO memory 120 write clock signals WCLK at a frequency of 74.25 MHz and read clock signals RCLK at a frequency of 71.28 MHz.

Accordingly, the FIFO memory 112 shown in FIG. 7 compensates for speed differences between the image signals of the frame memory 112 and the speed of 71.28 MHz of the printer 38.

In the present embodiment, as shown in FIG. 8 iii), by skipping signals WE as to be low for a period of 3 pixels during a period of 74 pixels, magnification varying processing using pixel skipping may be realized. Various other kinds of magnification varying processing may be considered for the present embodiment.

Figure 9:
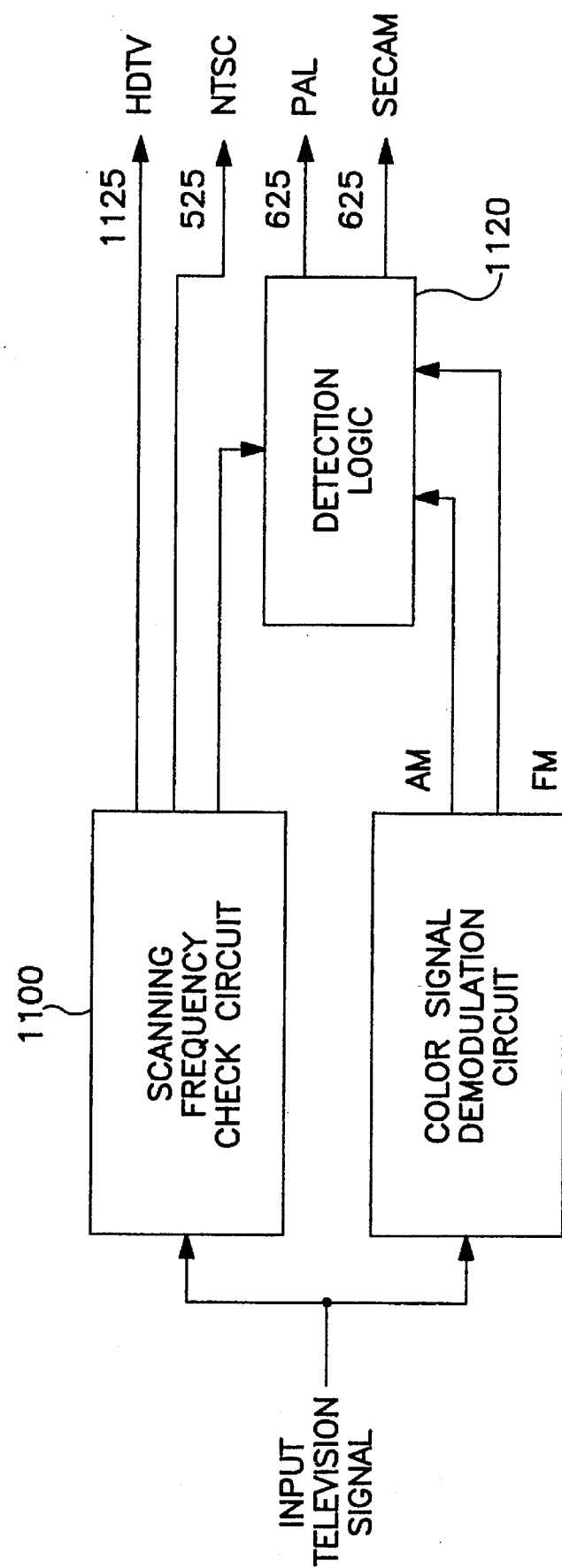
FIG. 9 shows an example of the signal discrimination circuit 48 shown in FIG. 1.

A detailed explanation of the signal discrimination circuit 48 will now be provided with reference to FIG. 9.

In FIG. 9, a scanning frequency check circuit 1100 checks the number of vertical scanning lines of an input television signal. If the number is 1125, the circuit 1100 determines that the signal is an HDTV signal. If the number is 525, the circuit 1100 determines that the signal is an NTSC signal (for the purpose of simplifying the explanation, consideration of the PAL system used in Brasil, and the like will be omitted). If the number is 625, after checking the modulation method by a color signal demodulation circuit 1110, the circuit 1100 determines that the signal is a PAL signal in the case of AM, and that the signal is a SECAM signal in the case of FM. The circuit 1100 inputs the result of discrimination of the kind of the input television signal to the system control circuit 42.

Subsequently, the system control circuit 42 controls respective units including the printer 38 in accordance with the operation of the operation key/panel unit 40, and displays the contents of setting by the system control circuit 42 on the display unit 44.

An explanation will now be provided of an example of indication and display of varying magnification when printing, for example, three copies of an image of an NTSC composite signal in a size twice the standard size. The NTSC composite signal subjected to 4 fsc sampling selected by the switch 46 is separated into a luminosity signal and a color signal by the conversion circuit 54 of the video decoder 52, further converted into RGB signals by the RGB primary color forming circuit 56, and subjected to YMC complementary color forming processing suitable for the printer 38 by the YMC complementary color forming circuit 58. The output of the YMC complementary color forming circuit 58, serving as the output of the video coder 52, is supplied to the magnification varying processing circuit 36 via the switch 34.

In accordance with the result of discrimination that the signal is an NTSC signal (a composite signal sampled with a frequency of 4 fsc), the signal discrimination circuit 48 reads magnification varying information (in this case, since X:Y=910:700=130:100 as described above, the varying magnification ratio is 100/130≈77% (reduction)) for the NTSC signal (the composite signal having a frequency of 4 fsc) from the LUT 50, and supplies the magnification varying processing circuit 36 with the read information. Information of double-size printing is supplied from the system control circular 42 to the magnification varying processing circuit 36. Hence, the magnification varying processing circuit 36 finally performs magnification varying processing of a varying magnification ratio X:Y=230:200, whereby a color print having a size twice the standard size is obtained from the printer 38.

The display device 44 displays "200%" to indicate the magnification. In the case of unit magnification, only "unit magnification" is displayed. Data relating to the correction processing of the aspect ratio of a pixel are not displayed except when it is requested. Thus, it is possible to provide an apparatus which is easy to handle.

Figure 10:
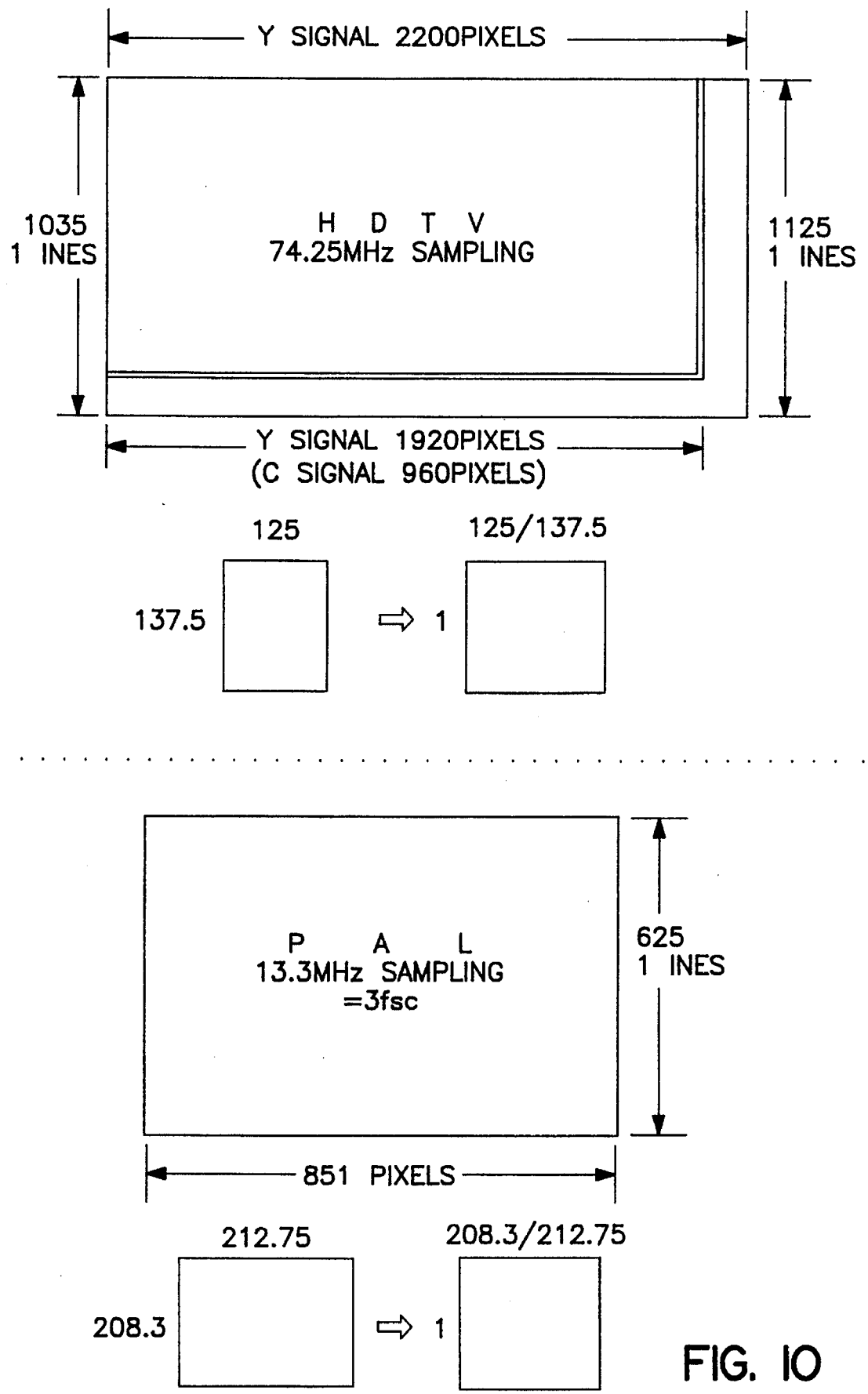
FIG. 10 illustrates aspect ratios of image signals conforming to the HD standard, the PAL standard and the SECAM standard.

Next, an explanation will be provided of processing when an image signal conforming to the HD standard or the PAL standard is input, with reference to FIG. 10.

As shown in FIG. 10, an image signal conforming to the HD standard, having the width of the BTA standard, has 2200 pixels in the horizontal direction and 1125 scanning lines in the vertical direction, and 1920 effective pixels in the horizontal direction and 1035 effective scanning lines in the vertical direction.

As is apparent from these figures, the aspect ratio of a pixel is 137.5:125, as shown in FIG. 10. In outputting a pixel having such an aspect ratio to the printer, the size of the pixel in the horizontal direction may be set to a reduction ratio of 125/137.5, that is, about 90%.

When an image signal conforming to the PAL standard is input, the number of scanning lines in the vertical direction is 625, and the number of pixels in the horizontal direction becomes 851 when the image signal is sampled with a frequency three times the frequency of the color sub-carrier. As is apparent from these figures, the aspect ratio of a pixel becomes 208.3:212.75. In outputting a pixel having such an aspect ratio to the printer, the size of the pixel in the horizontal direction may be set to a magnification ratio of 212.75/208.3, that is, about 103%. A signal conforming to the SECAM standard may be dealt with in the same manner as in the case of a signal conforming to the PAL standard.

In a state wherein the above-described image signals conforming to the PAL, SECAM, NTSC and HD standards are input to respective terminals shown in FIG. 1, a signal conforming to one standard is selected by the selection switch 46 in accordance with a signal from the operation key/panel unit 40, and is input to the video decoder 52. At the same time, data of the above-described varying magnification ratio selected from the XY aspect ratio LUTs 50a–50d in accordance with the discrimination by the signal discrimination circuit 48 are set to the magnification varying processing circuit 36. It is thereby possible to obtain an excellent image from the printer 38.

Figure 3:
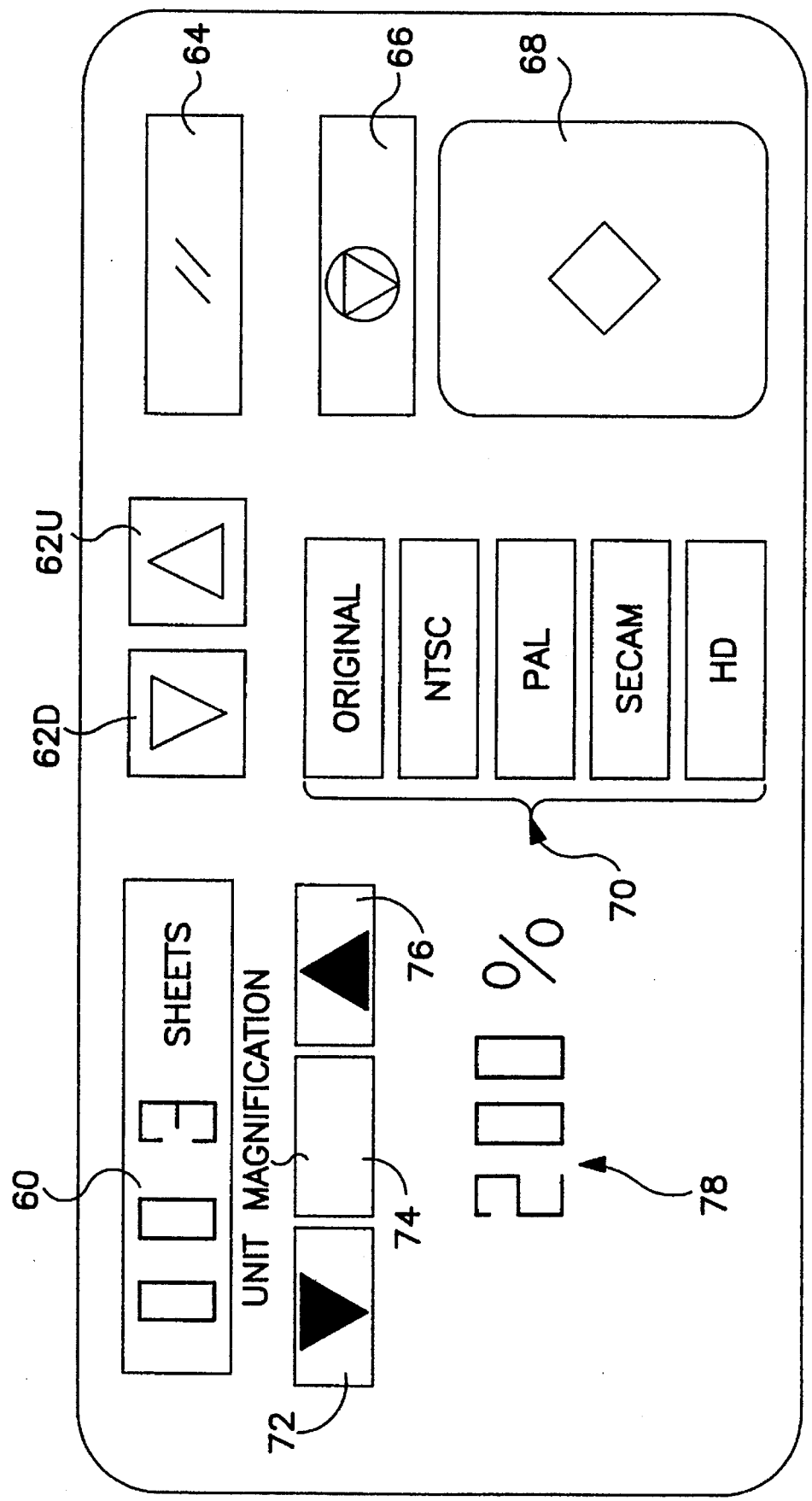
FIG. 3 is an example of display.

FIG. 3 shows a display surface and an example of display using the operation key/panel unit 40 and the display unit 44 in the present embodiment. In FIG. 3, a display surface 60 displays the number of prints. A down switch 62D and an up switch 62U are used for setting the number of prints. A clear key 64 clears the settings. There are also shown a stop key 66, a start key 68, a panel 70 for selecting and displaying inputs, input keys 72, 74 and 76 for selecting varying magnification ratios, and a display 78 of a varying magnification ratio which has been set.

Figure 4:
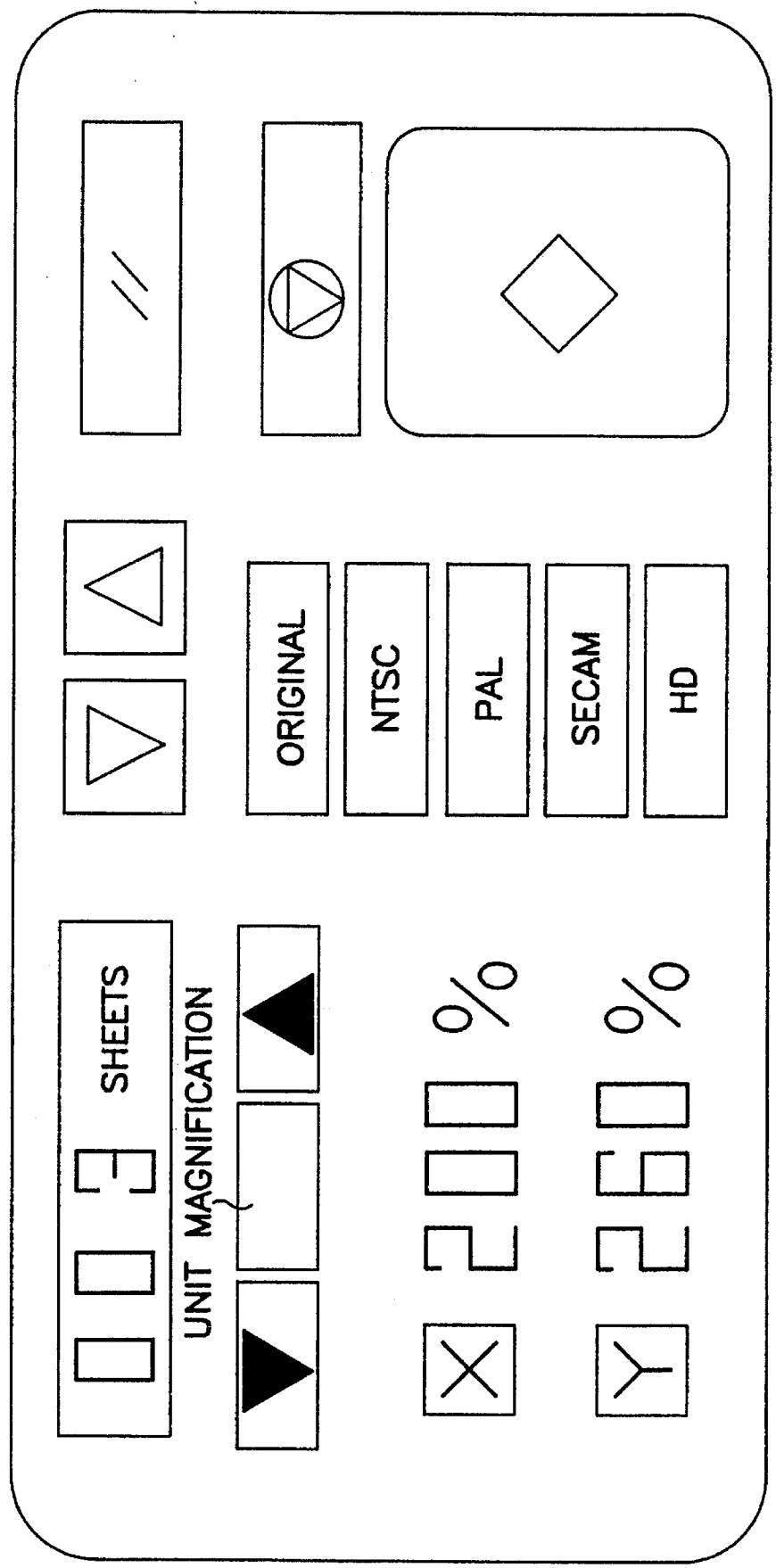
FIG. 4 is an example of display to be compared with the example shown in FIG.
Figure 5:
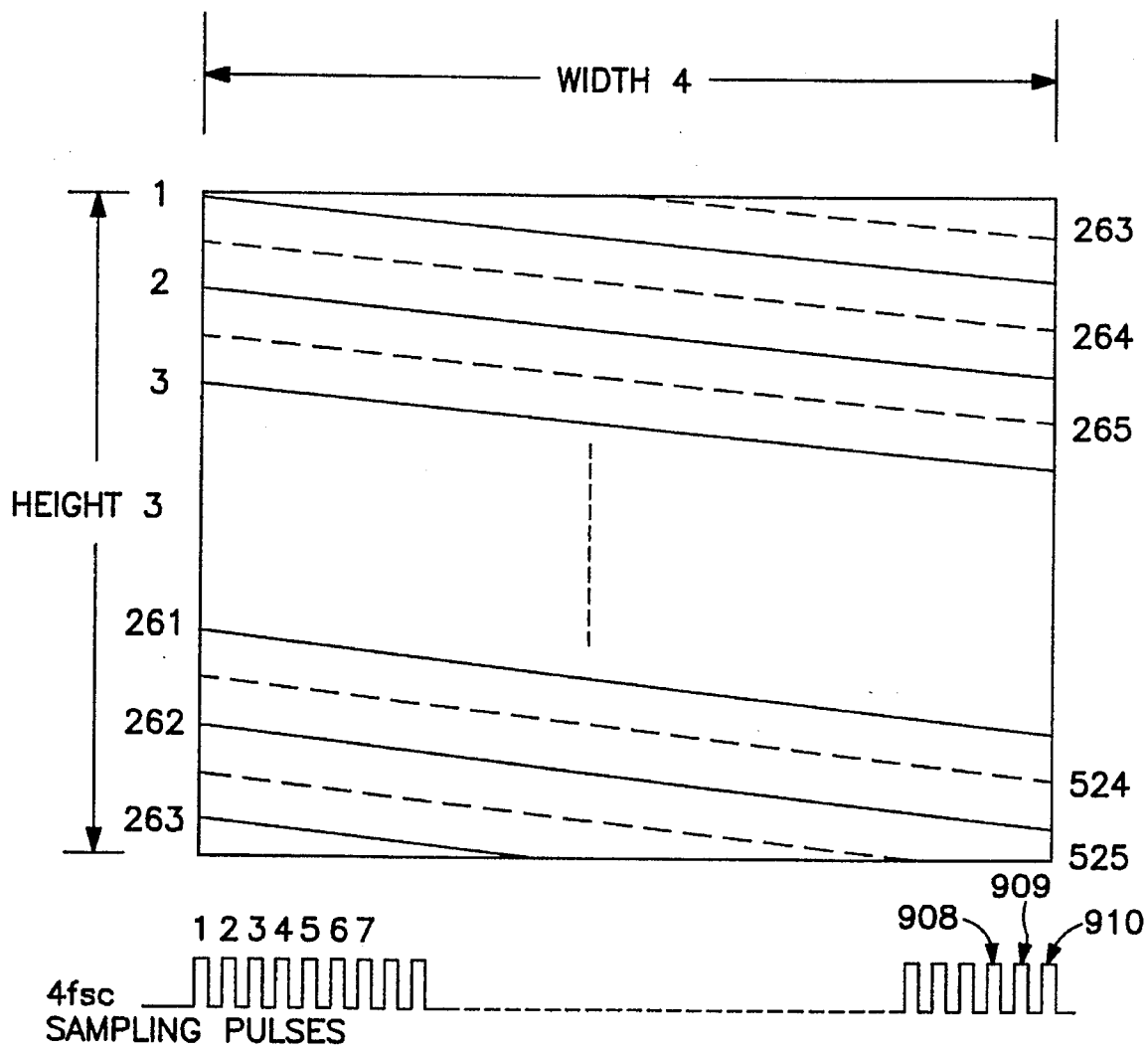
FIG. 5 is a diagram illustrating the relationship between scanning lines and sampling pulses.
Figure 6:
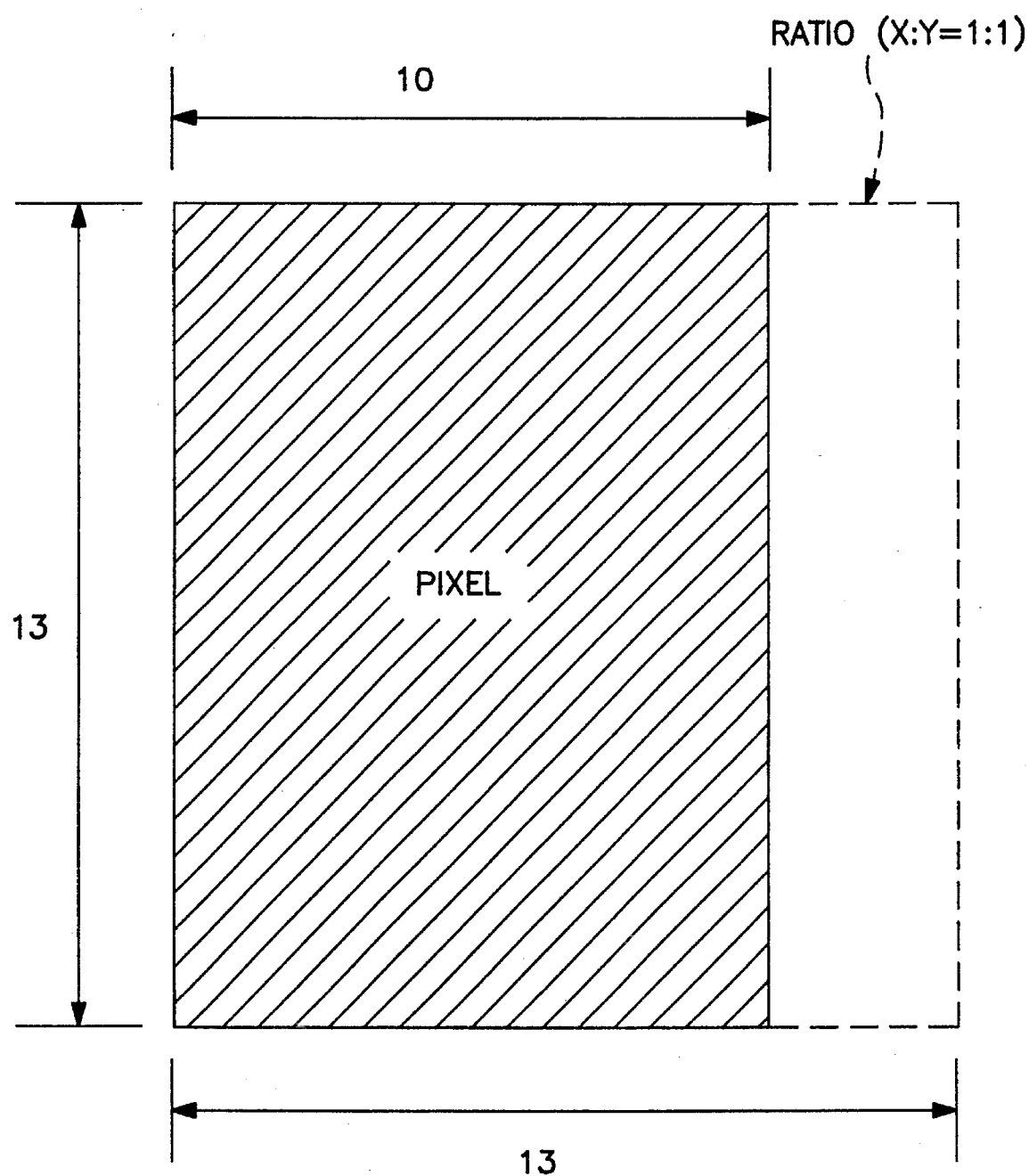
FIG. 6 illustrates the shape of a pixel.

Since a conventional apparatus is arranged to set varying magnification ratios individually in the X and Y directions, switches for assigning X and Y, and display areas for varying magnification ratios in the X and Y directions are provided in addition to the above-described components, causing complicated display and operation. To the contrary, display and operation become very simple in the present embodiment. For the purpose of comparison, an example of display in a conventional apparatus is shown in FIG. 4.

As can be easily understood from the foregoing explanation, according to the present embodiment, since the correction of the aspect ratio of a pixel is automatically performed, the operation of the user is much simplified, and it is possible to easily obtain a color video print without misoperation.

According to the present embodiment, since the kind of an input signal is discriminated by the signal discrimination circuit 48 after selecting a desired image signal by controlling the selection switch 46 in accordance with the operation of the operation key/panel unit 40, an excellent print image may be easily obtained without misoperation even if, for example, the user erroneously inputs a signal conforming to the PAL standard to an input terminal for a signal conforming to the NTSC standard.

The present invention is not limited to the above-described embodiment, but various changes and modifications may be made within the true spirit and scope of the appended claims.

What is claimed is:

1. An image processing apparatus for converting image data between a first digital image signal and a second digital image signal, a vertical-to-horizontal ratio of each pixel of the first digital image signal being different from a vertical-to-horizontal ratio of each pixel of the second digital image signal, said apparatus comprising:

a) input means for inputting the first digital image signal;

b) generating means for generating a discrimination signal capable of discriminating the vertical-to-horizontal ratio of each pixel of the first digital image signal input by said input means;

c) conversion means for forming the second digital image signal by converting the vertical-to-horizontal ratio of each pixel of the first digital image signal input by said input means into the vertical-to-horizontal ratio of each pixel of the second digital image signal in accordance with the discrimination signal generated by said generating means.

2. An image processing apparatus according to claim 1, wherein the first digital image signal conforms to a broadcast standard.

3. An image processing apparatus according to claim 2, wherein the discrimination signal indicates a kind of the broadcast standard of the first digital image signal.

4. An image processing apparatus according to claim 3, wherein said input means inputs image signals conforming to plural kinds of broadcast standards.

5. An image processing apparatus according to claim 1, further comprising output means for outputting the second digital image signal obtained by said conversion means to a printer.

6. An image processing apparatus according to claim 5, including said printer.

7. An image processing apparatus according to claim 1, wherein said conversion means includes a memory for storing the first digital image signal input by said input means and converts the first digital image signal into the second digital image signal by an address control of said memory.

8. An image processing apparatus, comprising:
  a) input means for inputting a first image signal conforming to a broadcast standard;
  b) generating means for generating a discrimination signal indicating a kind of the broadcast standard for the first image signal input by said input means; and
  c) conversion means for converting the first image signal input by said input means into a second image signal so as to form a predetermined aspect ratio of each pixel of the first image signal in accordance with the discrimination signal generated by said generating means.

9. An image processing apparatus according to claim 8, wherein the first image signal can be any signal selected from a group consisting of an image signal conforming to a NTSC standard, and an image signal conforming to a PAL standard.

10. An image processing apparatus according to claim 8, further comprising output means for outputting the second image signal obtained by said conversion means to a printer.

11. An image processing apparatus according to claim 10, including said printer.

12. An image processing apparatus according to claim 8, wherein said input means inputs image signals conforming to plural kinds of broadcast standards.

13. An image processing apparatus according to claim 12, further comprising selection means for selecting any one of image signals conforming to the plural kinds of broadcast standards.

14. An image processing apparatus according to claim 13, wherein said selection means is manually operated.

15. An image processing apparatus, comprising:
  a) selection means for selecting either an image signal from an original scanner or an image signal conforming to a broadcast standard; and
  b) conversion means for converting the image signal selected by said selection means into a second image signal so as to form a predetermined aspect ratio of each pixel of the selected image signal, said conversion means including control means for controlling a conversion in accordance with a selection performed by said selection means.

16. An image processing apparatus according to claim 15, further comprising generating means for generating a discrimination signal indicating a kind of an image signal conforming to a broadcast standard,
  wherein said control means controls the conversion in accordance with the discrimination signal generated by said generation means.

17. An image processing apparatus according to claim 15, further comprising magnification means for magnifying the second image signal obtained by said conversion means.

18. An image processing apparatus according to claim 17, further comprising output means for outputting the image signal magnified by said magnification means to a printer.

19. An image processing apparatus according to claim 18, including said printer.

* * * * *

UNITED STATES PATENT AND TRADEMARK OFFICE
CERTIFICATE OF CORRECTION

PATENT NO. : 5,493,418

DATED : February 20, 1996

INVENTOR(S) : KOJI TAKAHASHI, ET AL.

It is certified that error appears in the above-identified patent and that said Letters Patent is hereby corrected as shown below:

COLUMN 2

```
    Line 39, "FIG." should read --FIG. 3;--.
```

COLUMN 3

```
    Line 8, "signal." should read --signals.--.
    Line 49, "circuit 38" should read --circuit 36--.
```

COLUMN 6

```
    Line 53, "means;" should read --means; and--.
```

Signed and Sealed this

Twenty-third Day of July, 1996

Attest:

BRUCE LEHMAN

*Attesting Officer*     *Commissioner of Patents and Trademarks*